US007113781B1

(12) United States Patent
Allison et al.

(10) Patent No.: US 7,113,781 B1
(45) Date of Patent: Sep. 26, 2006

(54) METHODS AND SYSTEMS FOR GENERATING AND SENDING MESSAGES IN A MOBILE COMMUNICATIONS NETWORK IN RESPONSE TO A CHANGE IN LOCATION OF A SUBSCRIBER

(75) Inventors: Rick L. Allison, Holly Springs, NC (US); Thomas Matthew McCann, Morrisville, NC (US); Peter Joseph Marsico, Carrboro, NC (US)

(73) Assignee: Tekelec, Morrisville, NC (US)

( * ) Notice: Subject to any disclaimer, the term of this patent is extended or adjusted under 35 U.S.C. 154(b) by 793 days.

(21) Appl. No.: 09/649,461

(22) Filed: Aug. 25, 2000

Related U.S. Application Data

(60) Provisional application No. 60/187,443, filed on Mar. 7, 2000.

(51) Int. Cl.
*H04Q 7/20* (2006.01)
(52) U.S. Cl. .................. 455/432.1; 455/433; 455/466; 455/401
(58) Field of Classification Search ................ 455/432, 455/433, 466, 432.1, 401
See application file for complete search history.

(56) References Cited

U.S. PATENT DOCUMENTS

| | | | |
|---|---|---|---|
| 5,579,371 A | 11/1996 | Aridas et al. | |
| 5,724,658 A * | 3/1998 | Hasan | 455/445 |
| 5,915,222 A * | 6/1999 | Olsson et al. | 455/466 |
| 6,006,098 A | 12/1999 | Rathnasabapathy et al. | |
| 6,047,327 A * | 4/2000 | Tso et al. | 709/232 |
| 6,052,591 A * | 4/2000 | Bhatia | 455/445 |
| 6,091,958 A * | 7/2000 | Bergkvist et al. | 455/445 |
| 6,091,959 A * | 7/2000 | Souissi et al. | 340/825.49 |
| 6,097,960 A | 8/2000 | Rathnasabapathy et al. | |
| 6,119,014 A | 9/2000 | Alperovich et al. | |
| 6,122,510 A * | 9/2000 | Granberg | 455/432 |
| H1895 H | 10/2000 | Hoffpauir et al. | |
| 6,134,438 A | 10/2000 | Sawyer | |
| 6,144,663 A | 11/2000 | Hallenstal | |
| 6,151,505 A * | 11/2000 | Larkins et al. | 455/456.5 |
| 6,175,743 B1 | 1/2001 | Alperovich et al. | |
| 6,381,465 B1 * | 4/2002 | Chern et al. | 455/466 |
| 6,567,658 B1 | 5/2003 | Van De Graaf | |
| 6,611,687 B1 | 8/2003 | Clark et al. | |
| 6,622,016 B1 * | 9/2003 | Sladek et al. | 379/201.01 |
| 6,650,902 B1 | 11/2003 | Richton | |

(Continued)

FOREIGN PATENT DOCUMENTS

DE          198 05 261 A1      8/1999

(Continued)

OTHER PUBLICATIONS

Chatras et al., "Mobile Application Part Design Principles," International Switching Symposium, p. 1-9, (1990).

(Continued)

*Primary Examiner*—Matthew D. Anderson
*Assistant Examiner*—Sujatha Sharma
(74) *Attorney, Agent, or Firm*—Jenkins, Wilson, Taylor & Hunt P.A.

(57) ABSTRACT

A message processing platform correlates mobile call signaling messages transmitted between a home location register (HLR) and a (VLR) when a mobile subscriber changes locations. The message processing platform generates a change in location indication message in response to a change in location of a mobile subscriber. The change in location indication message is sent to a short message service center, which forwards a short message service message to the mobile subscriber.

65 Claims, 7 Drawing Sheets

U.S. PATENT DOCUMENTS 6,662,017 B1 * 12/2003 McCann et al. ............ 455/461
2002/0050927 A1    5/2002 De Moerloose et al.

FOREIGN PATENT DOCUMENTS

| EP | 0 710 043 A1 | | 5/1996 |
|---|---|---|---|
| GB | 710 043 A1 | * | 5/1996 |
| WO | WO99/40748 | | 2/1999 |

OTHER PUBLICATIONS

URS, "Roaming Notification and Local Service Control Through Short Message Service," Motorola, Inc., p. 17-19, (1998).

Digital Cellular Telecommunications System (Phase 2+); Technical Realization of the Short Message Service (SMS); (GSM 03.40 version 7.4.0 Release 1998), European Telecommunications Standards Institute, 1999.

Digital Cellular Telecommunications System (Phase 2+); Location Registration Procedures, (GSM 03.12 version 7.0.0 Release 1998), European Telecommunications Standards Institute, 1999.

Digital Cellular Telecommunications System (Phase 2+); Mobile Application Part (MAP) specification (GSM 09.02), European Telecommunications Standards Institute, 1997.

"Eagle Feature Guide," P/N 910-1225-01, Revision A, Tekelec, Mar. 1996.

U.S. Appl. No. 09/802,527, filed Mar. 7, 2001, Thomas Matthew McCann.

* cited by examiner

METHODS AND SYSTEMS FOR GENERATING AND SENDING MESSAGES IN A MOBILE COMMUNICATIONS NETWORK IN RESPONSE TO A CHANGE IN LOCATION OF A SUBSCRIBER

RELATED APPLICATION INFORMATION

This application claims the benefit of U.S. Provisional Patent Application No. 60/187,443, filed Mar. 7, 2000, the disclosure of which is incorporated herein by reference in its entirety.

TECHNICAL FIELD

The present invention relates to methods and systems for generating and sending messages in a mobile communications network. More particularly, the present invention relates to methods and systems for generating and sending messages in a mobile communications network in response to a change in location of a subscriber.

BACKGROUND ART

In mobile communications networks, information regarding mobile subscribers are stored in databases, referred to as home location registers (HLRs) and visitor location registers (VLRs). HLRs store information about subscribers that belong to the same network as the HLR. VLRs temporarily store information about subscribers who are currently "roaming" in the area serviced by that VLR. The VLR may belong to the subscriber's home network or to a foreign network. The HLR and VLR store information needed to correctly route voice calls or data communications to the mobile subscriber. This may include international mobile station identification (IMSI), mobile identification number (MIN), mobile directory number (MDN), and mobile station international ISDN number (MSISDN), as well as the IDs of the VLR and MSC with which the subscriber is currently associated. When a mobile subscriber travels from an area controlled by one VLR or MSC to an area controlled by a different VLR or MSC, a series of messages, referred to as mobile application part (MAP) messages, are exchanged to update contact information for the mobile subscriber in the VLR and HLR. In some instances, it may be desirable for the home network service provider to send a message to the provider's subscribers who are roaming in a foreign network or to a database in response to a change in location of the subscriber. It may also be desirable for the home network service provider to send a message to a foreign subscriber (i.e., a subscriber from a different network provider) who is roaming within the network. Examples of situations in which it may be desirable to send a message to a mobile subscriber in response to a change in location of the subscriber are:

Sending a greeting or "welcome" message to the roaming subscriber;
Sending travel information, such as hotels, restaurants, etc. in the area in which the subscriber is roaming;
Sending advertising information regarding services available in the area; and
any other type of message that may be of interest to the roaming subscriber.

Although the MAP protocol defines procedures for updating information in registers, such as HLRs and VLRs, the protocol does not specify a means for notifying a network element, such as a short message service center (SMSC) or a presence server, of a change in location of a subscriber. Moreover, the protocol does not specify a method for delivering a message to either of these entities, and thus to the subscriber, in response to a change in location of the subscriber.

Accordingly, there exists a need for novel methods and systems for generating messages in response to a change in location of a mobile subscriber.

DISCLOSURE OF THE INVENTION

Methods and systems for generating messages in response to a change in location of a mobile subscriber include a signaling gateway and an associated message processing platform. The message processing platform may be internal to or external to the signaling gateway. The signaling gateway may perform routing operations similar to those of a conventional signal transfer point. In addition, the signaling gateway may copy messages communicated between an HLR and a VLR in response to a change in location of a subscriber. The message processing platform may correlate these messages, determine when the messages indicate that a subscriber has changed locations, and generate a change location indication message in response to detecting a change in location. The change in location indication message may contain the same information stored by the VLR, such as the MSISDN and IMSI number for the subscriber, in addition to other pertinent information.

The change in location indication message may be sent to any suitable node, such as a short message service center (SMSC) or a presence server. The message processing platform may communicate directly with the SMSC via TCP/IP or another protocol defined by the Public Land Mobile Network (PLMN), or it may communicate indirectly via traditional SS7/MAP protocol. If the receiving node is a short message service center, the short message center may generate a short message service (SMS) message and send the SMS message to the mobile subscriber. If the receiving node is a presence server, the presence server may update presence information for the subscriber in a presence server database. This presence information may be used by others to learn the location and communication medium through which the mobile subscriber will most likely be reachable.

Accordingly, it is an object of the present invention to generate messages in response to a change in location of the mobile subscriber.

Some of the objects of the invention having been stated hereinabove, other objects will be evident as the description proceeds, when taken in connection with the accompanying drawings as best described hereinbelow.

BRIEF DESCRIPTION OF THE DRAWINGS

A description of the present invention will now proceed with reference to the accompanying drawings of which.

DETAILED DESCRIPTION OF THE INVENTION

Delivering Short Message Service Messages to Home Subscriber

Roaming in Foreign Network

Figure 1:
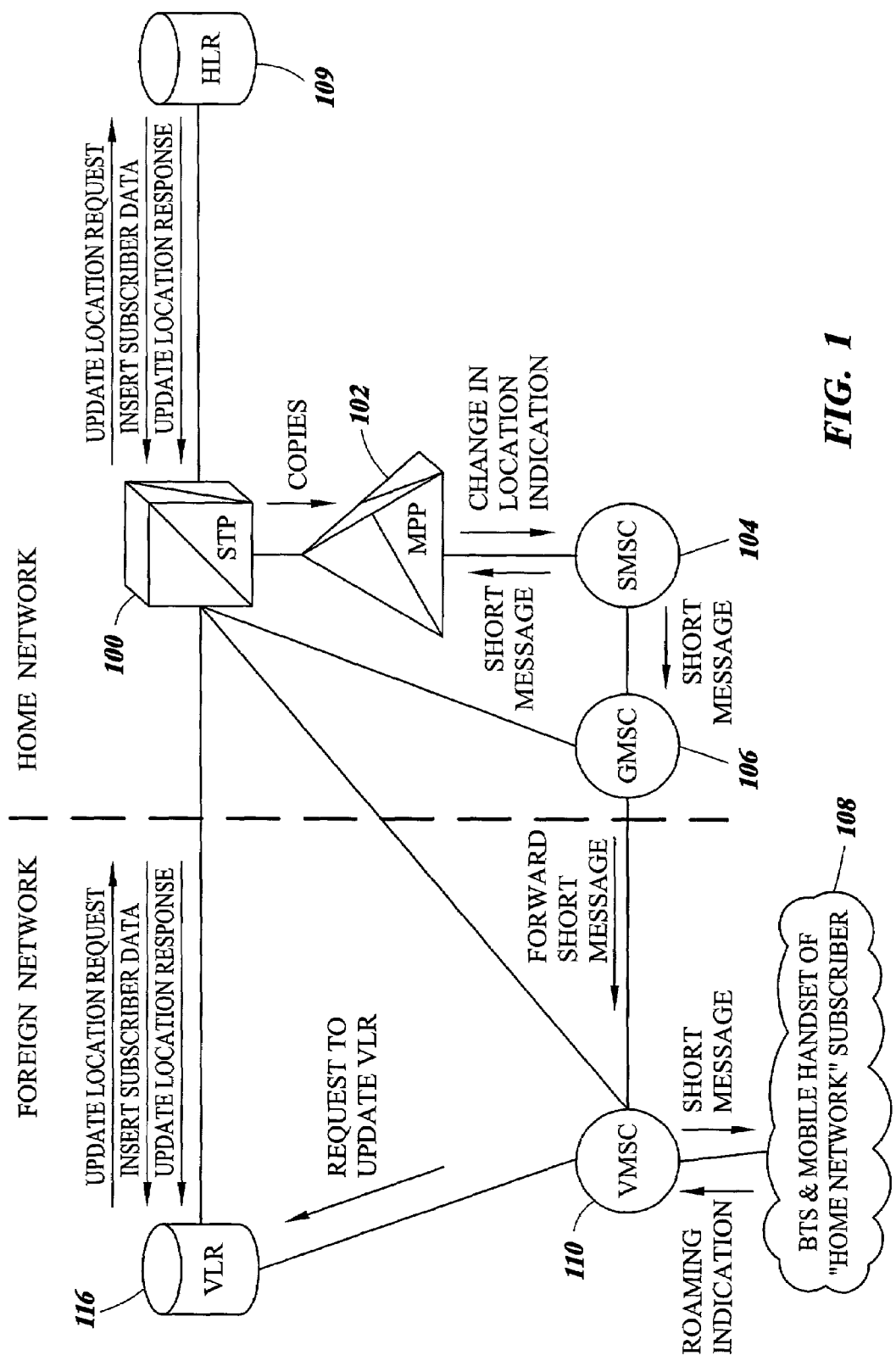
FIG. 1 is a block and message flow diagram illustrating delivery of a short message service message to a home network subscriber roaming in a foreign network according to an embodiment of the present invention.

FIG. 1 is a block and message flow diagram illustrating the delivery of short message service messages to a subscriber in response to a change in location of the subscriber. In FIG. 1, the dashed line separates the home network from the foreign network. For purposes of this example, the term "home network" refers to the network that generates a message in response to a change in location of a subscriber. The term "foreign network" refers to a network other than the home network that is associated with the delivery of information related to the roaming subscriber.

In the illustrated embodiment, the home network includes signal transfer point 100 capable of sending and receiving SS7 messages. Signal transfer point 100 may be any type of conventional signal transfer point, such as the EAGLE® STP available from Tekelec, Inc., of Calabasas, Calif. The internal architecture of a signal transfer point suitable for use with the present invention will be discussed in detail below.

Although not shown in FIG. 1, signal transfer point 100 may consist of a mated pair of STPs, as this is a common deployment in communications networks. In this case, message processing platform 102 would communicate with both STPs in the pair and would correctly correlate messages independent of the STP through which the messages were routed. Alternatively, signal transfer point 100 may be an SS7/IP gateway capable of sending and receiving both SS7 and IP messages between IP nodes. The internal architecture of a signaling gateway suitable for use with the present invention will be discussed in detail below. The architecture illustrated in FIG. 1 may also include a mated pair of SS7/IP gateways.

In the illustrated embodiment, message processing platform 102 is coupled to signal transfer point 100 via a signaling link, which may employ TCP/IP, SS7 or other protocols. Message processing platform 102 may be a workstation, such as a Sun Netra™ server. Software executing on message processing platform 102 performs functions associated with delivering short message service messages to mobile subscribers in response to changes in location of the subscribers, as will be discussed in more detail below. Although message processing platform 102 is illustrated as being separate from STP 100, the present invention is not intended to be limited to such an embodiment. For example, in an alternative embodiment of the invention, the functionality provided by message processing platform 102 may be integrated within signal transfer point 100. The integrated embodiment will be described in more detail below.

Short message service center 104 is a network element that delivers short message services to mobile subscribers. Short message services and location updating procedures for GSM networks are described in:

1) ETSI ETS 300 974, Tenth Edition, April 2000 (GSM 09.02 Version 5.14.1 Release 1996), Digital Cellular Telecommunication System (Phase 2+), Mobile Application Part (MAP) Specification;
2) ETSI TS 100 901 version 7.4.0 1999-12 (GSM 03.40 Version 7.4.0 Release 1998), Digital Cellular Telecommunications System (Phase 2+); Technical Realization of the Short Message Service (SMS); and
3) ETSI TS 100 530 Version 7.0.0 1999-08 (GSM 03.12 Version 7.0.0 Release 1998), Digital Cellular Telecommunications Systems (Phase 2+), Location Registration Procedures.

Although the details discussed in this document relate to GSM networks, the invention can easily be adapted for use in IS-41 networks as well. Information regarding procedures used in these networks can be found in ANSI/TIA/EIA-41-D-97, Cellular Radiotelecommunications Intersystem Operations, February, 1996.

Gateway mobile switching center 106 communicates with VMSC 110, which communicates with mobile subscriber handsets, such as handsets 108, that are not within their local service area. Although not illustrated in FIG. 1, such communications typically occur through a base station that contains an antenna and a transmitter for sending the messages to the mobile subscriber 108. In this illustration, GMSC 106 is also responsible for acting as an SMS-GMSC to deliver short messages from SMSC 104 to a VMSC 110. Functions performed by mobile switching centers include set up and tear down of calls and delivery of data communications.

Home location register 109 stores information regarding subscribers of the home network. Such information may include the IMSI, MIN, MDN or MSISDN number and the current VLR and/or VMSC associated with each subscriber. Visitor location register (VLR) 116 stores information regarding roaming subscribers. Like HLR 109, information stored in VLR 116 may include IMSI, MIN, MDN or MSISDN numbers for the subscriber. In some networks, the functions of VMSC 110 and VLR 116 may be combined into one network entity. For clarity, they are shown as separate entities in FIG. 1.

The system illustrated in FIG. 1 is adapted to deliver short message service messages to a home subscriber who is roaming in a non-local network in response to a change in location of a home subscriber. In FIG. 1, when a home subscriber illustrated by handset 108 moves to a foreign network, handset 108 sends a signal through the base station (not shown) to VMSC 110. VMSC 110 opens a dialogue with VLR 116, requesting the VLR be updated with the roaming subscriber's information. VLR 116 generates a MAP_Update_Location_Request message and sends the update location request message to HLR 109 through STP 100.

Internal STP Architecture

STP 100 includes internal subsystems for processing and routing messages that are similar to those of a conventional EAGLE signal transfer point or an IP[7] SECURE GATEWAY™ available from Tekelec. A detailed description of the EAGLE® STP may be found in EAGLE® Feature Guide PN/910-1225-01, revision B, January 1998, published by Tekelec, the disclosure of which is incorporated herein by reference in its entirety. Similarly, a detailed description of the IP[7] SECURE GATEWAY™ may be found in Tekelec publication PN/909-0767-01, revision B, August 1999, entitled "Feature Notice: IP[7] SECURE GATEWAY™ Release 1," the disclosure of which is incorporated herein by reference in its entirety. The specific functions of the IP[7] SECURE GATEWAY™ for transmitting and receiving TCAP messages over an Internet protocol network are described in PCT Publication No. WO 00/35155, the disclosure of which is incorporated herein by reference in its entirety. Similarly, the functional components of the IP7 SECURE GATEWAY™ for transmitting ISUP messages over an Internet protocol network are described in PCT Publication No. WO 00/35156, the disclosure of which is incorporated herein by reference in its entirety.

Figure 2:
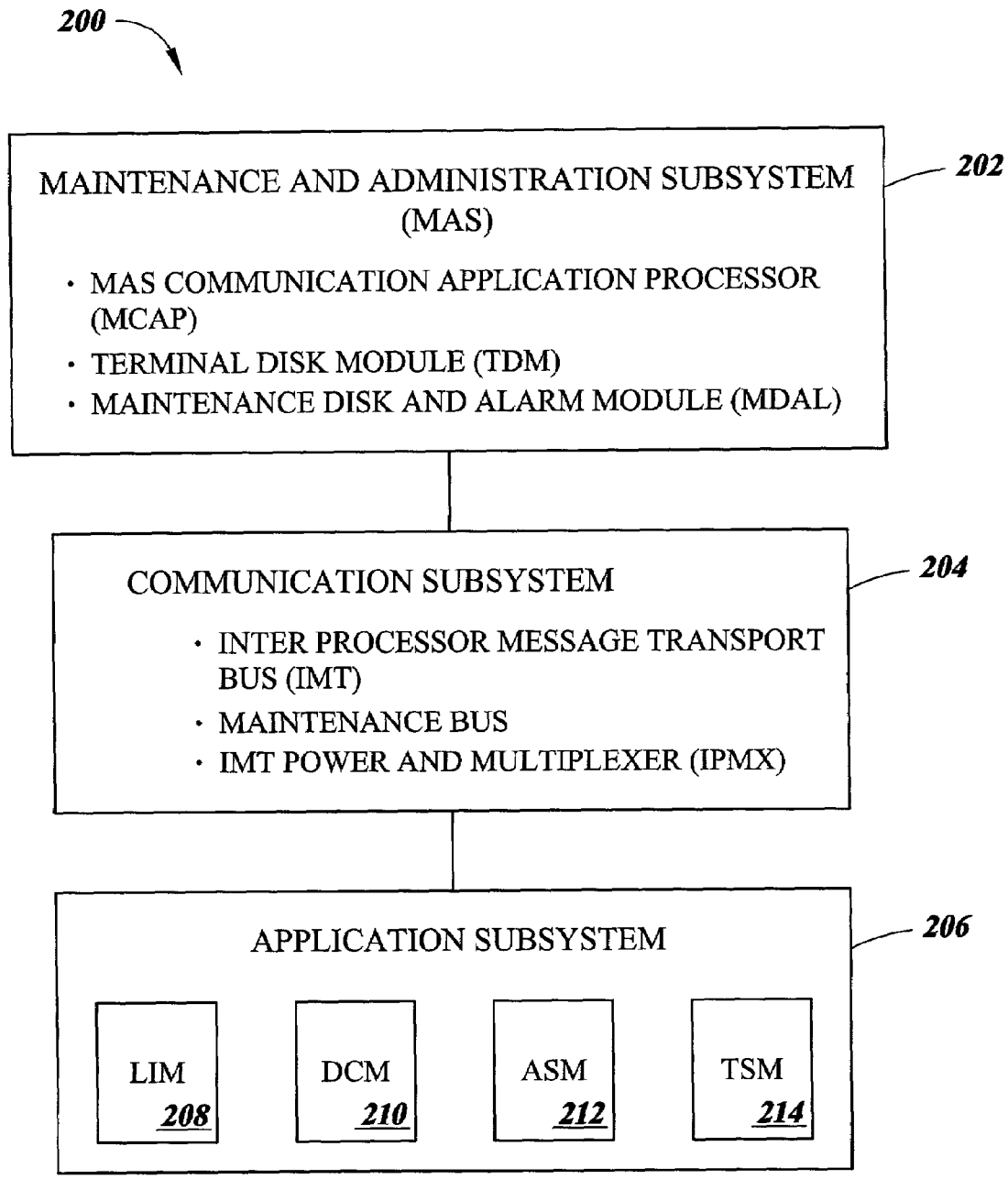
FIG. 2 is a block diagram of internal subsystems of a conventional signal transfer point or signaling gateway suitable for use with embodiments of the present invention.

FIG. 2 illustrates the internal subsystems of an EAGLE® STP or an IP[7] SECURE GATEWAY™ to which the methods for generating and sending messages to mobile subscribers in response to a change in location of the subscribers according to the present invention may be applied. In the illustrated embodiment, STP or signaling gateway 200 includes the following subsystems: a maintenance and administration subsystem (MAS) 202, a communication subsystem 204, and an application subsystem 206. The maintenance and administration subsystem 202 provides maintenance communications, initial program loading, peripheral services, provisioning capability, alarm processing, and system disks. Communication subsystem 204 includes an interprocessor message transport (IMT) bus that is the main communication bus among all of the subsystems in signaling gateway 200. In a preferred embodiment, the interprocessor message transport bus includes two 125 Mbps counter-rotating serial buses.

Application subsystem 206 includes cards that are capable of communicating with other cards through the IMT bus. Numerous types of application cards can be incorporated in signaling gateway 200. Examples of such cards includes a link interface module (LIM) 208 that provides SS7 and X.25 links, a data communications module (DCM) 210 that provides SS7-to-TCP/IP and TCP/IP-to-SS7 translation, and an application service module (ASM) 212, a transaction service module (TSM) 214, or a database service module (DSM) 216 that provide global title translation, gateway screening, and other services. While multiple application modules or cards may be simultaneously configured and operatively connected to the IMT bus, it will be appreciated that each card is assigned a unique IMT bus address so as to generally facilitate the internal communication of messages between provisioned cards that are attached to the IMT bus. Once again, a detailed description of the EAGLE® STP other than DCM 210 is provided in the above-cited EAGLE® Feature Guide and need not be described in detail herein. DCM 210 is described in detail in the above-referenced International Patent Publications.

With regard to communication type modules, DCM card 210 can be used to communicate IP-encapsulated SS7 messages over an IP network, as described in the above-referenced Feature Notice IP7 SECURE GATEWAY™ release 1.0 publication.

STP with Integrated Map Screening Module

Figure 3:
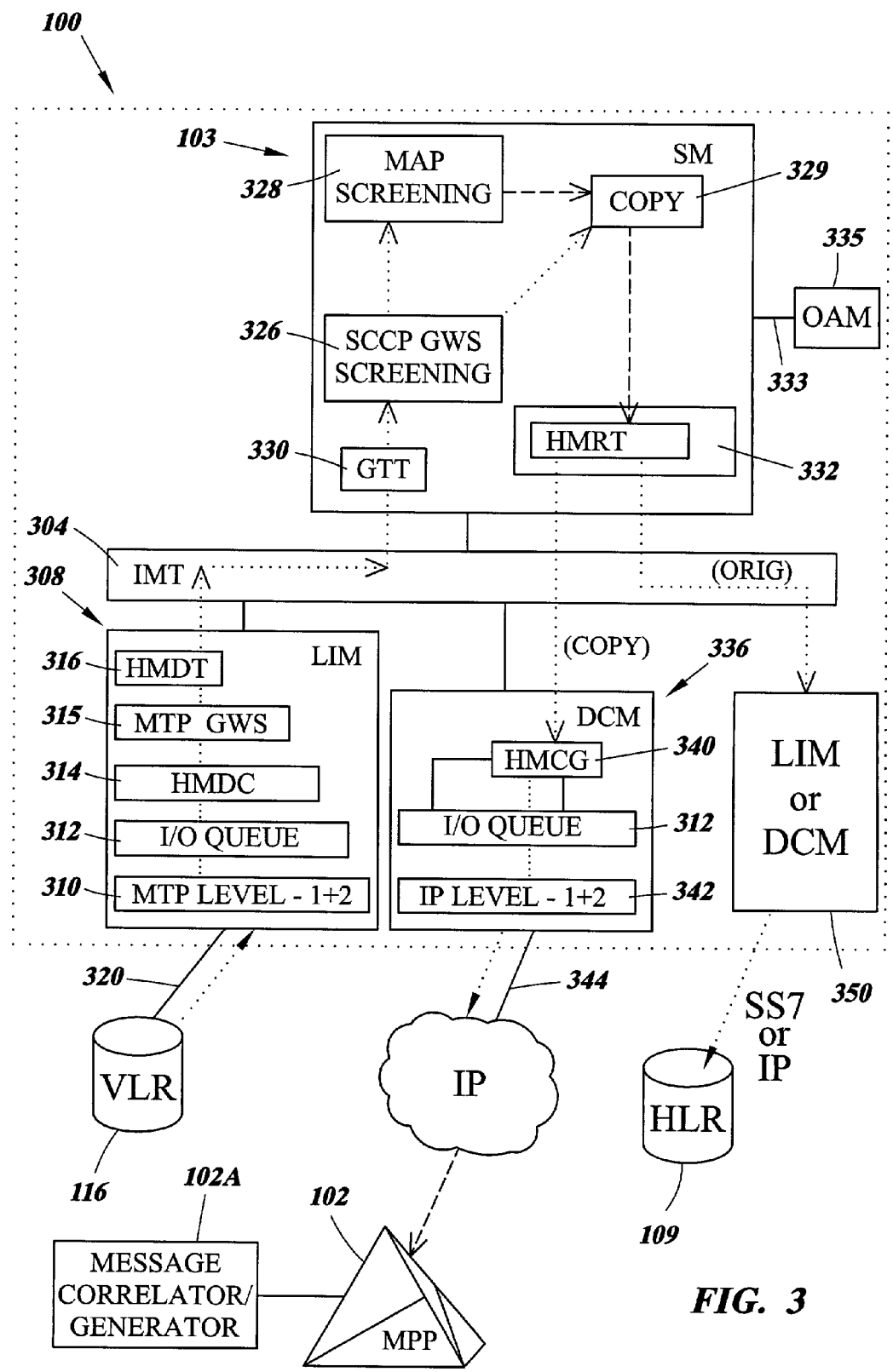
FIG. 3 is a block and message flow diagram illustrating MAP message flow through a signal transfer point with a MAP screening module according to an embodiment of the present invention.

An exemplary embodiment of a signaling gateway or signal transfer point that includes a MAP screening module (SM) suitable for use with the present invention is described in the above-referenced provisional patent application, which is entitled, "Methods and Systems for Mobile Application Part Screening." FIG. 3 is a block and message flow diagram including a signal transfer point with functionality for screening MAP messages transmitted between an HLR and a VLR when a subscriber changes location. Referring to FIG. 3, STP 100 includes link interface module 308 for sending and receiving SS7 messages over SS7 links. LIM 308 includes of a number of sub-components including, but not limited to: an SS7 MTP level 1 and 2 process 310, an I/O buffer or queue 312, HMDC process 314, MTP GWS process 315 and HMDT process 316. MTP level 1 and 2 process 310 provides the facilities necessary to send and receive digital data over a particular physical media/physical interface, as well as to provide error detection/correction and sequenced delivery of all SS7 message packets. I/O queue 312 temporarily buffers incoming and outgoing SS7 messages. HMDC process 314 performs a discrimination function for determining whether an incoming SS7 message packet requires internal processing or is simply to be through switched, i.e., routed to another node. MTP GWS process 315 provides gateway screening on the MTP portion of the message. HMDT process 316 handles internal routing of SS7 message packets that require additional processing prior to final routing.

Interprocessor message transport (IMT) bus 304 provides a reliable transport mechanism for transporting messages between modules in signaling gateway 102. In a preferred embodiment, IMT bus 304 comprises a dual counter-rotating bus so that traffic can be re-routed in response to a module failure.

SM Service module (SM) 103 performs SCCP and MAP screening functions on messages received from LIM 308 and DCM 336. In the illustrated embodiment, SM 103 includes SCCP gateway screening (GWS) process 326 for performing gateway screening functions on the SCCP layer of incoming messages, MAP screening process 328 for performing MAP screening of incoming messages, global title translation process 330 for performing global title translation of incoming messages, copy function 329 for copying selected messages to MPP 102 and HMRT function 332 for routing messages after screening, global title translation and/or MPP copy has been performed.

Although not illustrated in FIG. 3, it is understood that SCCP GWS screening process 326 may access one or more internal or external SCCP screening databases, MAP screening process 328 may access one or more internal or external MAP screening databases, and GTT process 330 may access one or more internal or external GTT databases. In order to maintain the databases, SM 103 is coupled to and serviced by an OAM subsystem 335 via an Ethernet connection 333. OAM subsystem 335 is responsible for administration and maintenance of the databases.

Data communication module (DCM) 336 is adapted to convert incoming IP-encapsulated SS7 messages into SS7 format and encapsulate outgoing SS7 messages in IP packets. In the illustrated embodiment, DCM 336 includes an HMCG process 340 that is responsible for monitoring congestion on the associated DCM linksets, and internally communicating this link congestion information to peer processes on other modules via IMT bus 304. The link congestion information is used by the HMRT function 332 during outbound link selection operations. It should be appreciated that outgoing SS7 message packets routed through the DCM 336 will be transmitted out of the STP 100 and into an Internet Protocol (IP) network. STP 100 may include an additional LIM and/or DCM 350 for routing the original message to HLR 109.

As the SS7 communication protocol and the IP communication protocol are not inherently compatible, all SS7 message packets that are to be sent into the IP network 108 are first encapsulated within an IP routing envelope prior to transmission. This IP encapsulation is performed by an IP encapsulation process 342. The IP encapsulation process 342 is the IP protocol equivalent of the SS7 MTP level 1-2 layer process 310 of the LIM 308. One type of packet format for encapsulating various types of SS7 messages in IP packets is described in Technical Reference: Transport Adapter Layer Interface 2.0, published by Tekelec (May 31, 2000). However, it is not the intent of the present invention to be limited to this format. Other formats may be used including SCTP/M3UA|M2UA, the EAGLE's STPLAN feature, etc. Alternatively, the messages may be passed to the external platform via traditional SS7 protocol using a LIM card on the STP instead of the DCM.

STP with External Map Screening Module

As an alternative to the embodiment described above, SM 103 may not contain MAP Screening process 328. In such an embodiment, all other functionalities of SM 103 would remain the same, and MAP Screening process 328 would then be integrated on MPP 102 instead of on STP 100.

MAP Screening Internal to STP

Figure 4A:
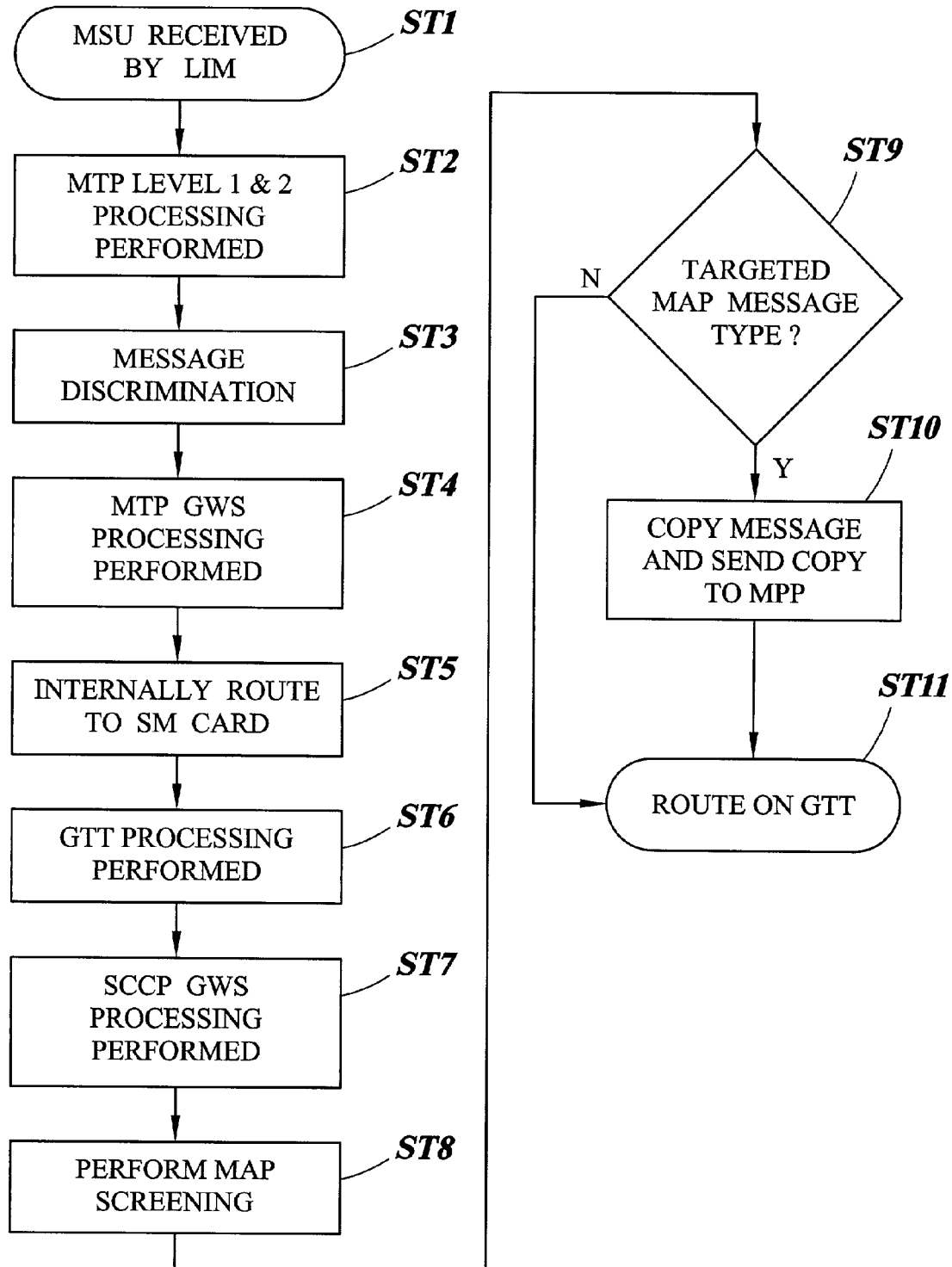
FIG. 4A is a flow chart illustrating steps performed by the signal transfer point in FIG. 3 in processing a MAP message when MAP screening functionality is located internal to the STP according to an embodiment of the present invention.

FIG. 4A is a flow chart illustrating exemplary steps that may be performed by the processes illustrated in FIG. 3 for performing MAP and SCCP screening functions for sending messages transmitted between an HLR and a VLR in response to a change in location of a subscriber when MAP screening process 328 is integrated with STP 100. In step ST1, LIM 308 receives an SS7 message signal unit (MSU). In step ST2, MTP level 1 and 2 process 310 performs MTP level 1 and 2 processing on the incoming message. In step ST3, HMDC function 314 performs message discrimination, e.g., by examining the destination point code or other fields, in the message to determine whether the message is to be internally routed or through switched. In this example, it is assumed that the message is to be internally routed.

In step ST4, MTP GWS process 315 is performed on the incoming message. If the message is not screened (i.e., rejected) by MTP GWS, it will be passed to SM 103 as described in step ST5 below.

In step ST5, HMDT process 316 routes the message to the appropriate internal address for further processing. In this example, HMDT process 316 routes the message to SM module 103 for further processing. Once SM module 103 receives the message, in step ST6, global title translation process 330 performs global title translation (GTT) on the message. In step ST7, SCCP GWS process 326 screens the message based on one or more SCCP parameters in the GTT'd message.

If the message is not screened (rejected) by SCCP screening process 326, it is passed to MAP screening process 328. In steps ST8 and ST9, MAP screening process 328 performs MAP screening on the message by examining the parameters in the TCAP/MAP portion of the message. These parameters include, but are not limited to the CgPA and CdPA SSNs, MAP opcode and related fields in the MAP portion of the message. Within the context of the present invention, the MAP Op-Codes that would be subject to screening would be those for the MAP Update Location Request, MAP Insert Subscriber Data and MAP Update Location Response, although screening could be performed on any MAP Op-Code. If a message meets the screening criteria, it will then be passed to copy function 329. In step ST10, copy function 329 makes a copy of the message and sends the message to MPP 102. If MPP 102 is external to STP 100, copy function 329 passes the message to HMRT function 332. HMRT function 332 routes the message to the card associated with the appropriate outbound signaling link, which in this case is DCM 336. DCM 336 wraps the SS7 message in a suitable IP header and sends the message to MPP 102. Meanwhile, the original message will be passed on to the intended end node unchanged. For example, the original message may be sent to LIM or DCM 350 for transmission to HLR 109 via an SS7 or IP network. In step ST11, if MAP screening function 328 determines that the message is not one of the targeted message types, the message is not copied and is routed to its intended destination.

If MPP 102 is internal to the STP, copy function 329 sends the message to the internal MPP. An internal MPP may reside on SM 103 or on a separate card. If MPP 102 resides on SM 103, copy function 329 may simply send the message to the appropriate MPP process resident on MPP 102. If MPP is not resident on SM 103, copy function 329 may send the message to the card containing MPP 102 over IMT bus 304. MPP 102 will then correlate messages that are part of the same dialogue as described below.

The present invention is not limited to the steps described above for performing MAP screening. For example, using one or any combination of: OPC, DPC, Orig. SSN, Dest. SSN, CgPA, CdPA and MAP Op-Code is intended to be within the scope of the invention.

MAP Screening—Functionality External to STP

Figure 4B:
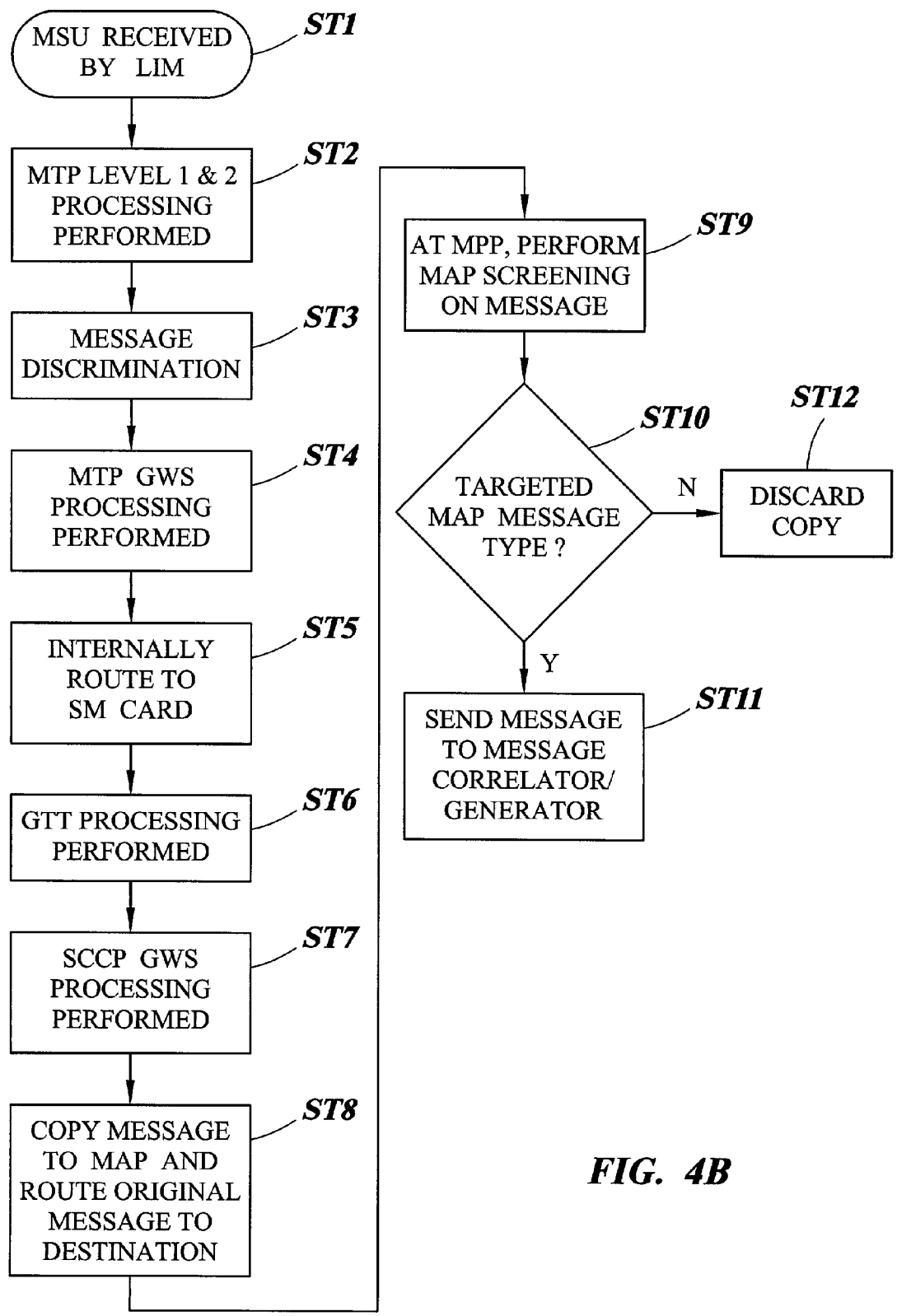
FIG. 4B is a flow chart illustrating steps performed by the signal transfer point in FIG. 3 in processing a MAP message when MAP screening functionality is located external to the STP according to an embodiment of the present invention.

FIG. 4B illustrated exemplary steps that may be performed by STP 100 and MPP 103 when MAP screening process 328 is external to STP 100. If MAP screening process 328 is not integrated with STP 100 and is instead integrated with MPP 102, the process described above will be the same with the exception that in step ST7, SCCP GWS process 326 will be responsible for sending the message directly to copy function 329 based on parameters in the SCCP portion of the message, which may include CdPA and CgPA SSNs or OPC/DPC. In step ST8, if the message is screened by SCCP GWS, the message is copied to MPP 102 as described above and the original message is routed to its destination unchanged. In this case, SCCP GWS is configured to copy screened messages rather than discarding them. Once MPP 102 receives the copied message, it passes the message to MAP screening function 328. In steps ST9 and ST10, MAP screening is performed as described above. In step ST11, if the result of MAP screening is that the message is one of the targeted messages (e.g. MAP_UPDATE_LOCATION_REQUEST), the steps detailed below are followed for correlation and generation of a short message. In step ST12, the message is not a targeted message, the copy is discarded by MPP 102 and processing will stop for that message.

Referring back to FIG. 1, STP 100 routes the original update location request message to HLR 109. The update location request message is a mobile application part (MAP) message that contains identification and location information about the subscriber. In the case of a GSM network, this could include the IMSI number, or other subscriber ID, the VMSC number, and the VLR number. Signal transfer point 100 not only routes this message to HLR 109, but, according to the present embodiment, copies the message and forwards the message to message processing platform 102, as described above.

In response to the update location request message, HLR 109 exchanges a sequence of MAP messages to VLR 116. These messages include a MAP_Insert_Subscriber_Data_request that contains the MSISDN number. HLR 109 also a sends a MAP Update Location Response which contains the HLR number and terminates the HLR⇔VLR dialogue. Signal transfer point 100 notes the arrival of both messages and sends copies to message processing platform 102. The last message in the sequence is the update location response. This message is forwarded from HLR 109 through STP 100 to VLR 116.

MAP Message Correlation and Location Update

Indication Message Generation

Figure 5:
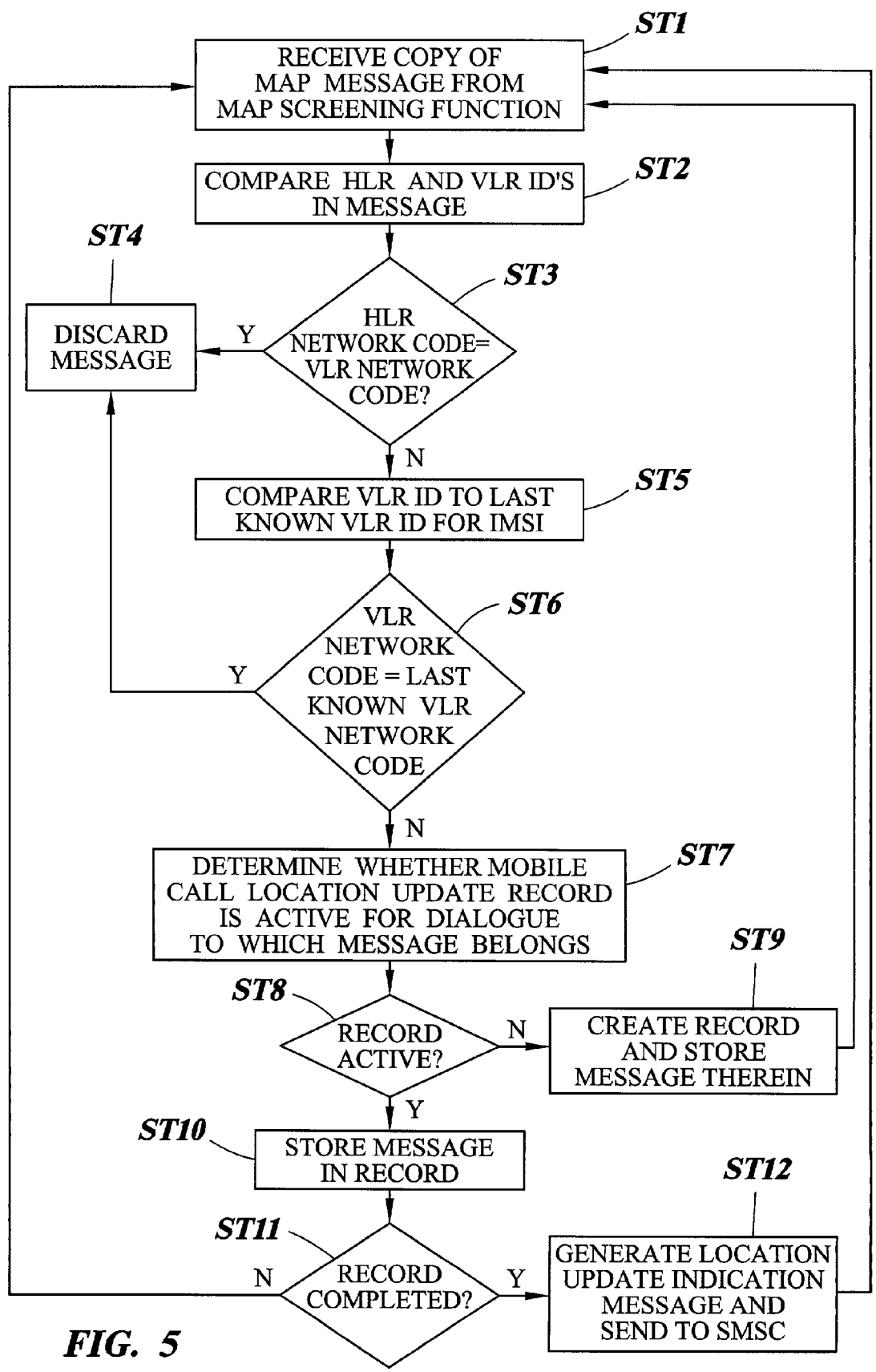
FIG. 5 is a flow chart illustrating exemplary steps performed by a message processing platform in correlating MAP messages transmitted between an HLR and a VLR according to an embodiment of the present invention.

Message processing platform 102 includes message correlator/generator 102a for correlating MAP messages and for generating a change in location indication message. FIG. 5 illustrates exemplary steps that may be performed by message correlator/generator 102a in correlating MAP messages and generating the change in location indication message. Referring to FIG. 5, in step ST1, message correlator/generator 102a receives a copy of a targeted MAP message from MAP screening process 328. Again, this process may be integrated with STP 100 or MPP 102. According to an important aspect of the present invention, it may be desirable to send a message to the subscriber only the first time the subscriber registers with a VLR in a non-home network. A subscriber may change VLRs many times within a single network, including the subscriber's home network. The location update procedure described herein is performed each time a subscriber registers with a new VLR, regardless of whether the new VLR is in a different network from the previous or whether the VLR is in the same network as the subscriber's HLR. Therefore, it is necessary for message correlator/generator 102a to be able to distinguish two cases: 1) location update procedures occurring between the HLR and a VLR within the subscriber's home network, and 2) location update procedures occurring between the HLR and a non-home network VLR if the subscriber has previously registered with another VLR in that network.

To accomplish this, when a new message arrives, in steps ST2 and ST3, message correlator/generator 102a compares the HLR and VLR IDs. In step ST4, if the IDs indicate that the HLR and VLR belong to the same network (determined by the network code in the ID), the copy of the message is discarded and processing stops for this message. In steps ST5 and ST6, if the HLR and VLR are in different networks, message correlator/generator 102a consults a Roaming Table that holds a list of IMSIs and the last VLR ID known to be associated with that IMSI. The stored VLR ID and the received VLR ID are compared. If they belong to the same network, this indicates the subscriber has simply switched to a new VLR within the same network, and a new welcome message is not needed. Accordingly, control returns to step ST4 where the copied message is discarded and processing stops for this message. If the stored and received VLR IDs belong to different networks, processing continues as described below.

In the location update procedure defined by GSM 09.02 and described above, the VLR initiates a MAP dialogue with the subscriber's HLR. This dialogue will continue for the duration of the location update procedure. The first message in this dialogue may be a update location request, which is identified by its MAP opcode. Per ITU-T Q.771, Functional Description of Transaction Capabilities, each message that is part of a dialogue is identified by a unique dialogue ID in the TCAP portion of the message. It is this dialogue ID that may be used to correlate MAP messages. However, the present invention is not limited to using the dialogue ID to correlate messages. Correlation based on any parameter that appears in MAP messages exchanged between an HLR and a VLR when a subscriber changes locations is within the scope of the invention.

It should be noted that several different HLR⇔VLR dialogues may be taking place simultaneously through STP 100. Therefore, it is necessary that message correlator/generator 102a be able to create individual mobile call location update records to store messages associated with a particular dialogue. As used herein, the term mobile call location update record refers to data stored in memory for call that includes some or all of the parameters from the messages transmitted between an HLR and a VLR in response to a change in location of a mobile subscriber. A mobile call location update record may be identified by the dialogue ID contained in all messages in the dialogue between the HLR and the VLR. A mobile call location update record may contain an entry for each message in the dialogue. For example, a mobile call location update record according to the present invention may include an entry for the Location Update Request message, an entry for the Insert Subscriber Data message, and an entry for the Update Location Response message. Each entry may include the complete message, a portion of the message, and the time of receipt of each message. However, the present invention is not limited to any particular mobile call location update record format. Any format that contains information relating to the dialogue between an HLR and a VLR when a subscriber changes location is within the scope of the invention.

Returning to the flow diagram in FIG. 5, once it has been determined that a subscriber has moved to a non-home network in which the subscriber has not previously registered with a VLR, in steps ST7 and ST8, message correlator/generator 102a determines whether a mobile call location update record is active for the dialogue. In step ST9, if a record is not active, message correlator/generator 102a creates a record and stores the message or a portion of the message therein. Control then returns to step ST1 for processing the next received message.

A new call record is created even if the message is not the initial message in the location update procedure sequence as defined by GSM 09.02. This is necessary due to the fact that STP 100 may be deployed with a mate STP. In this case, MPP 102 may receive some messages in a sequence from one STP and some from the other STP. Thus, if one STP is experiencing delays in getting messages to the MPP while the other is not, it may be possible for the Insert Subscriber Data or Update Location Response to arrive at the MPP before the Update Location Request. In order to handle error cases in which, for some reason, all of the messages expected in a sequence are either not delivered or not copied to the MPP, a timeout will be implemented for each mobile call location update record. If all expected messages in a sequence are not received and logged in a mobile call location update record within a specified time, the mobile call location update record and all entries within it will be erased. Each mobile call location update record will be configured in such a way that the expected number of messages in a sequence is known. Therefore, regardless of the order in which the messages are received, a change in location indication message will be generated when all messages in the sequence are received.

Returning to FIG. 5, in step ST10, if message correlator/generator 102a determines that a mobile call location update record is active for the dialogue corresponding to the dialogue ID in the received message copy, message correlator/generator 102a stores the message copy in the record. In step ST11, message correlator/generator 102a determines whether the record has been completed, i.e., whether all of the messages in the dialogue have been received. As discussed above, it is not necessary that the messages be received in order. If the record is not complete, control returns to step ST1 to process the next received message. In step ST12, once the record is completed, message correlator/generator 102a generates a change in location indication message and sends the message to an SMSC.

The change in location indication message includes the subscriber ID, i.e., the IMSI, MIN, MDN and/or MSISDN numbers, the VLR number, the HLR number, the MSC number, the date, and the time. The message may be passed directly to the SMSC over any suitable communication medium, such as TCP/IP connection or using the PLMN's specified protocol per GSM 03.40. The message may alternatively be passed indirectly to the SMSC via STP 100 and GMSC 106 using traditional SS7 signaling.

Referring back to FIG. 1, upon receipt of the change in location indication message, the short message service center generates a short message containing a welcome message, or other message as determined by the operator. The SMSC then forwards this message to GMSC 106. The protocol between SMSC 104 and GMSC 106 is specified by the PLMN. Alternatively, SMSC 104 may forward the message back to MPP 102 which then forwards the message to STP 100. STP 100 then forwards the short message to gateway mobile switching center 106. In either case, once gateway mobile switching center 106 receives the short message, it sends a MAP_Forward_Short_Message, containing the welcome message (or other message), to VMSC 110, which then sends a short message to roaming subscriber 108 via the base station network not shown in FIG. 1.

The embodiment illustrated in FIG. 1 illustrates exemplary steps that may be performed by a signal transfer point, a message processing platform, and a short message service center in delivering a welcome message or other message to a subscriber that enters a foreign network in response to a change in location of the subscriber. Although in the embodiment illustrated in FIG. 1, signal transfer point 100, message processing platform 102, and short message service center 104 are illustrated as separate components, the present invention is not limited to such an embodiment. For example, the functionality of message processing platform 102 and short message service center 104 may be integrated within signal transfer point 100. In such an embodiment, signal transfer point 100 may include an internal mobile call record generator that correlates and stores call sequence information generated when a mobile subscriber changes locations. Once the last message in response to the change of location is generated, the mobile call record generator notifies a short message service center application of the change in location. The short message service center application sends a short message service message to a gateway mobile switching center. The gateway mobile switching center sends the short message to the VMSC servicing the roaming subscriber. Thus, the present invention includes embodiments in which the message processing platform functionality and/or short message service center functionality are integrated within the signal transfer point 100. In yet another alternative embodiment of the invention, the message processing platform functionality may be integrated with the short message service center, and this combined platform may be external to STP 100.

Delivering Short Message Service Messages to Foreign Subscriber

Roaming in Home Network

Figure 6:
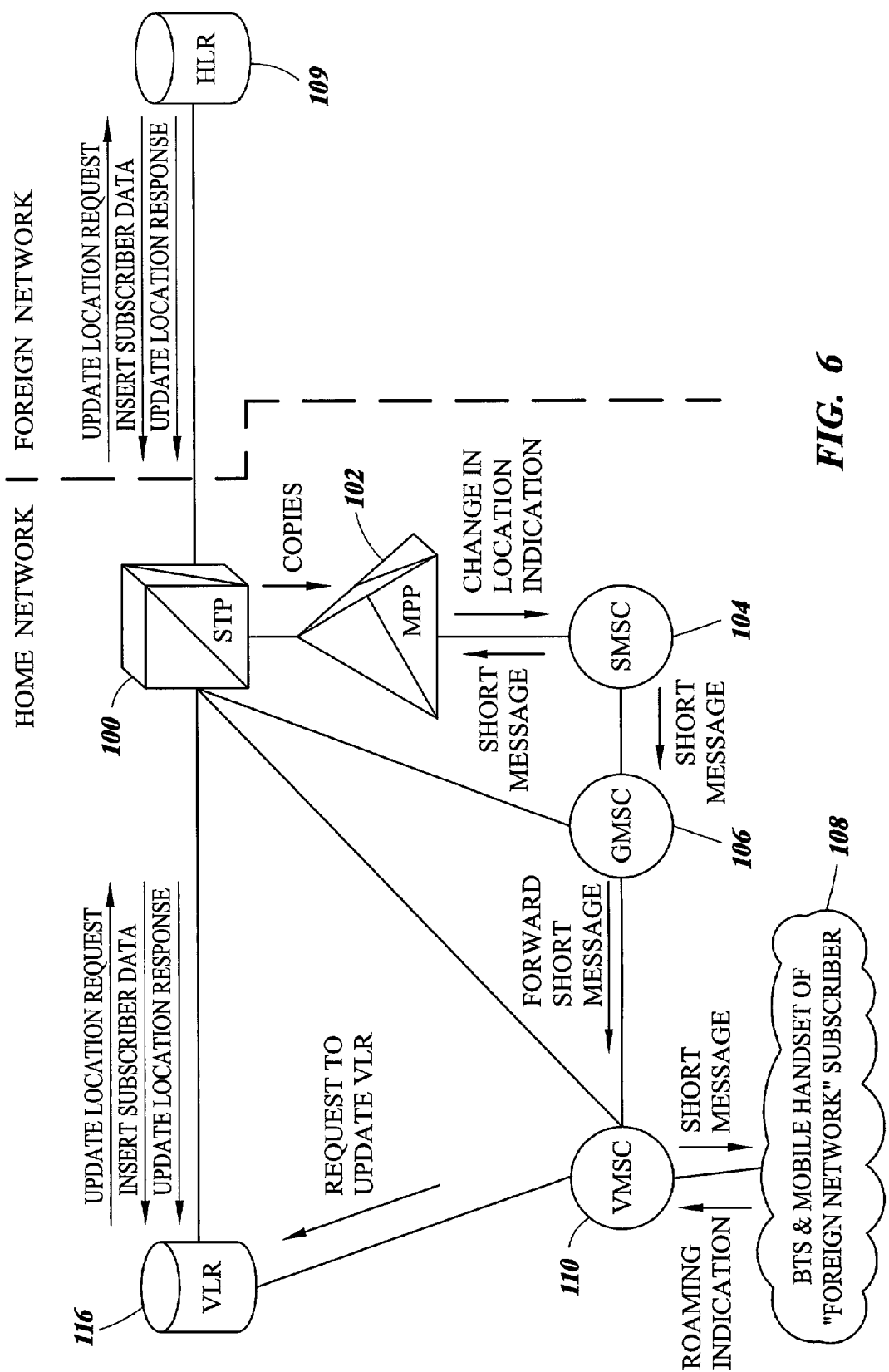
FIG. 6 is a block and message flow diagram illustrating the delivery of a short message service message to a foreign subscriber located in the network of the service provider that generates the short message service message.

FIG. 6 illustrates an exemplary message flow between a signal transfer point, a message processing platform, and a short message service center in delivering an SMS message to a mobile subscriber from a foreign network in response to entry of the mobile subscriber into a home network. The message flow illustrated in FIG. 6 is basically the same as the message flow illustrated in FIG. 1 with the exception that the VMSC in the home network delivers the short message to the mobile subscriber 108. Thus, FIG. 6 illustrates a method by which a short message service center, a message processing platform, and a signal transfer point deliver a short message, such as a welcome message, to a foreign subscriber roaming in the service provider's home network. As with the embodiment illustrated in FIG. 1, the short message service center and the message processing platform may be separate from or integrated within the signal transfer point without departing from the scope of the invention.

The present invention is not limited to delivering messages to mobile subscribers in response to a change in location of the mobile subscribers. For example, in an alternative embodiment, the present invention may include generating and delivering presence protocol messages to a presence server in response to a change in location of a subscriber. For example, in the embodiment illustrated in FIG. 1, when mobile subscriber 108 enters the foreign network, message processing platform 102 may send a presence protocol message, including the subscriber ID, i.e., the IMSI and MSISDN numbers, the VLR number, the HLR number, the MSC number, the date, and the time, to a presence server. The presence server may receive this information and store the information in a presence server database. Subscribers to the presence server database may then use the information to send messages, such as instant messages, to the mobile subscriber.

Although in the embodiments described above with respect to FIGS. 1 and 6, the message processing platform is coupled to the STP, the present invention is not limited to such an embodiment. For example, the message processing platform may be coupled to or associated with the HLR or the VLR to correlate MAP messages transmitted between the HLR and the VLR.

In yet another alternative embodiment of the invention, the message processing platform may be similar in structure to the Message Generator/Traffic Simulator (MGTS) available from Tekelec. The MGTS is conventionally used to simulate and monitor SS7 network traffic. According to the present invention, the MGTS can be used to capture MAP messages and generate the MAP change in location indication message described above. In such an embodiment, the MGTS would have a correlation/message generation function similar to that described above with respect to FIG. 5.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for automatically generating and sending a short message service (SMS) message to a subscriber in a mobile communications network in response to a change in location of the subscriber, the method comprising:
    (a) receiving, at a telecommunications network element, a plurality of mobile call signaling messages;
    (b) screening, at the telecommunications network element, mobile call signaling messages exchanged between a home location register (HLR) and a visitor location register (VLR) that relate to in location of mobile subscribers;
    (c) correlating the screened mobile call signaling messages based on at least one parameter in the mobile call signaling messages to identify mobile call signaling messages in a dialogue between the HLR and the VLR that relates to a change in location of a particular mobile subscriber;
    (d) generating a change in location indication message based on parameters extracted from the correlated mobile call signaling messages;
    (e) sending the change in location indication message to a short message service center (SMSC);
    (f) in response to receiving the change in location indication message by SMSC, generating an SMS message intended for the particular mobile subscriber; and
    (g) sending the SMS message to the mobile subscriber, wherein performing steps (a)–(g) includes performing steps (a)–(g) automatically in response to the change in location of the particular mobile subscriber.

2. The method of claim 1 wherein receiving a plurality of mobile call signaling messages includes receiving a mobile application part (MAP) update location request message.

3. The method of claim 1 wherein receiving a plurality of mobile call signaling messages includes receiving a mobile application part (MAP) insert subscriber data message.

4. The method of claim 1 wherein receiving a plurality of mobile call signaling messages includes receiving a mobile application part (MAP) update location response message.

5. The method of claim 1 wherein generating a change in location indication message includes generating the change in location indication message using a home location register Identifier (HLR ID) identifying an HLR of the particular mobile subscriber.

6. The method of claim 1 wherein generating a change in location indication message includes generating the change in location indication message using a visitor location register identifier (VLR ID) identifying a VLR currently serving the particular mobile subscriber.

7. The method of claim 1 wherein generating a change in location indication message includes generating the change in location indication message using a mobile identification number (MIN), mobile directory number (MDN) or mobile subscriber ISDN (MSISDN) number.

8. The method of claim 1 wherein generating a change in location indication message includes generating the change in location indication message using an international mobile station identity (IMSI) number.

9. The method of claim 1 wherein generating a change in location indication message includes generating the change in location indication message using an MSC ID.

10. The method of claim 1 wherein generating a change in location indication message includes generating a change in location indication message including a date and a time.

11. The method of claim 1 wherein generating an SMS message includes generating a message welcoming or greeting the particular mobile subscriber or other type of message that a mobile communications network operator desires to send to a subscriber.

12. The method of claim 1 wherein generating an SMS message includes generating at least one of: an advertisement, a weather report, hotel information, and other information that a mobile communications network operator wishes to send to the particular mobile subscriber.

13. The method of claim 1 wherein correlating the mobile call signaling messages includes correlating the mobile call signaling messages based on a Dialogue ID in the mobile call signaling messages.

14. The method of claim 1 wherein receiving a plurality of mobile call signaling messages at a telecommunications network element includes receiving a plurality of mobile call signaling messages at a signal transfer point and routing the mobile call signaling messages to their intended destinations.

15. The method of claim 1 wherein correlating the screened mobile call signaling messages based on at least one parameter in the mobile call signaling messages to identify mobile call signaling messages in a dialogue between the HLR and the VLR includes correlating the mobile call signaling messages to identify a mobile application part (MAP) update location request message, a MAP insert subscriber data message, and a MAP update location response message that relate to a change in location of the particular mobile subscriber.

16. A method for automatically generating and sending a short message service (SMS) message to a subscriber in a mobile communications network in response to a change in the location of the subscriber, the method comprising:
    (a) receiving a plurality of mobile call signaling messages at a telecommunications network element;
    (b) screening, at the telecommunications network element, mobile call signaling messages exchanged between a home location register (HLR) and a visitor location register (VLR) that relate to in location of mobile subscribers;
    (c) correlating the screened mobile call signaling messages to identify mobile call signaling messages in a dialogue between the HLR and the VLR that relates to a change in location of a particular mobile subscriber;
    (d) combining parameters extracted from the correlated mobile call signaling messages to generate an SMS message intended for the particular mobile subscriber; and
    (e) sending the SMS message to the mobile subscriber, wherein performing steps (a)–(e) includes performing steps (a)–(e) automatically in response to the change in location of the particular mobile subscriber.

17. The method of claim 16 wherein receiving a plurality of mobile call signaling messages at a telecommunications network element includes receiving a mobile application part (MAP) update location request message.

18. The method of claim 16 wherein receiving a plurality of mobile call signaling messages at a telecommunications network element includes receiving a mobile application part (MAP) Insert subscriber data message.

19. The method of claim 16 wherein receiving a plurality of mobile call signaling messages at a telecommunications network element includes receiving a mobile application part (MAP) update location response message.

20. The method of claim 16 wherein combining parameters extracted from the correlated mobile call signaling messages to generate an SMS message includes using an HLR identifier to generate the SMS message.

21. The method of claim 16 wherein combining parameters extracted from the correlated mobile call signaling messages to generate an SMS message intended for the particular mobile subscriber includes using a VLR identifier extracted from the correlated mobile call signaling messages to generate the SMS message.

22. The method of claim 16 wherein combining parameters extracted from the correlated mobile call signaling messages to generate an SMS message intended for the particular mobile subscriber includes using at least one of a mobile identification number (MIN), a mobile directory number (MDN), and a mobile subscriber ISDN (MSISDN) number to generate the SMS message.

23. The method of claim 16 wherein combining parameters extracted from the correlated mobile call signaling messages to generate an SMS message intended for the particular mobile subscriber includes using an international mobile station identity (IMSI) number extracted from the correlated mobile call signaling messages to generate the SMS message.

24. The method of claim 16 wherein combining parameters extracted from the correlated mobile call signaling messages to generate an SMS message intended for the particular mobile subscriber includes using an MSC ID extracted from the correlated mobile call signaling messages to generate the SMS message.

25. The method of claim 16 wherein combining parameters extracted from the correlated mobile call signaling messages to generate an SMS message intended for the particular mobile subscriber includes using a date and a time derived from the mobile call signaling messages to generate the SMS message.

26. The method of claim 16 wherein the SMS message is a message welcoming or greeting the particular mobile subscriber, or other message that a mobile communications network operator desires to send to the particular mobile subscriber.

27. The method of claim 16 wherein correlating the mobile call signaling messages includes correlating the mobile call signaling messages based on a Dialogue ID in the mobile call signaling messages.

28. The method of claim 16 wherein receiving a plurality of mobile call signaling messages at a telecommunications network element includes receiving a plurality of mobile call signaling messages at a signal transfer point and routing the mobile call signaling messages to their intended destinations.

29. The method of claim 16 wherein correlating the screened mobile call signaling messages based on at least one parameter in the mobile call signaling messages to identify mobile call signaling messages in a dialogue between the HLR and the VLR includes correlating the mobile call signaling messages to identify a mobile application part (MAP) update location request message, a MAP insert subscriber data message, and a MAP update location response message that relate to a change in location of the particular mobile subscriber.

30. A method for correlating mobile call signaling messages transmitted between a home location register (HLR) and a visitor location register (VLR) in response to a change in location of a mobile subscriber, the method comprising:

(a) receiving, at a telecommunications network element, a plurality of mobile call signaling messages exchanged between a home location register (HLR) and a visitor location register (VLR);

(b) screening, at the telecommunications network element, from the mobile call signaling messages, messages that relate to changes in location of mobile subscribers;

(c) correlating the screened mobile call signaling messages based on one or more parameters in the mobile call signaling messages to identify mobile call signaling messages in a dialogue between the HLR and the VLR that relates to a change in location of a particular mobile subscriber; and (d) generating mobile call location update records based on the correlated mobile call signaling messages, wherein performing steps (a)–(d) includes performing steps (a)–(d) automatically in response to the change in location of the particular mobile subscriber.

31. The method of claim 30 wherein correlating the screened mobile call signaling messages based on one or more parameters in the mobile call signaling messages includes correlating the mobile call signaling messages based on a dialogue ID contained in the mobile call signaling messages.

32. The method of claim 30 comprising comparing an HLR ID and a VLR ID in each screened mobile call signaling message and determining whether a subscriber is roaming in a foreign network in which the subscriber has not previously registered with a VLR based on the comparison.

33. The method of claim 32 comprising, in response to determining that the subscriber is roaming in a foreign network in which the subscriber is not previously registered with a VLR, continuing correlation processing for the mobile call signaling messages.

34. The method of claim 32 comprising, in response to determining that the subscriber is not roaming in a foreign network in which the subscriber is not previously registered with a VLR, stopping correlation processing for the mobile call signaling messages.

35. The method of claim 30 wherein storing the mobile call signaling messages in mobile call location update records comprises, in response to receiving each of the mobile call signaling messages:

(a) determining whether a mobile call location update record is active;

(b) in response to determining that a mobile call location update record is active for the message, storing the message in the mobile call location update record; and (c) in response to determining that a mobile call location update record is not active for the message, creating a new mobile call location update record and storing the message therein.

36. The method of claim 30 comprising, in response to completing a mobile call location update record, generating a change in location indication message and sending the change in location indication message to a short message service center.

37. The method of claim 30 comprising for each mobile call change in location update record, in response to failing to receive all of the mobile call signaling messages to complete the mobile call change in location update record within a predetermined time period, discarding the mobile call change in location update record.

38. The method of claim 30 wherein receiving a plurality of mobile call signaling messages at a telecommunications network element includes receiving a plurality of mobile call signaling messages at a signal transfer point and routing the mobile call signaling messages to their intended destinations.

39. The method of claim 30 wherein correlating the screened mobile call signaling messages based on at least one parameter in the mobile call signaling messages to identify mobile call signaling messages in a dialogue between the HLR and the VLR includes correlating the mobile call signaling messages to identify a mobile application part (MAP) update location request message, a MAP insert subscriber data message, and a MAP update location response message that relate to a change in location of the particular mobile subscriber.

40. A system for automatically generating and sending a short message service (SMS) message to a subscriber in a mobile communications network in response to a change in the location of the subscriber, the system comprising:

(a) a telecommunications network element for receiving a plurality of mobile call signaling messages and for screening mobile call signaling messages exchanged between a home location register (HLR) and a visitor location register (VLR) relating to changes in location of mobile subscribers;

(b) a message processing platform operatively associated with the telecommunications network element for receiving the screened mobile call signaling messages, for correlating the mobile call signaling messages to identify mobile call signaling messages in a dialogue between the HLR and the VLR related to a change in location of a particular mobile subscriber, and for generating a change in location indication message based on the correlated mobile call signaling messages; and (c) a short message service center (SMSC) for receiving the change in location indication message from the message processing platform and for generating an SMS message intended for the particular mobile subscriber, wherein the telecommunications network element, the message processing platform, and the short message service center are adapted to respectively perform the functions in elements (a)–(c) automatically in response to the change in location of the particular mobile subscriber.

41. The system of claim 40 wherein the telecommunications network element comprises a signal transfer point (STP).

42. The system of claim 40 wherein the telecommunications network element comprises a signaling gateway routing node.

43. The system of claim 40 wherein the telecommunications network element comprises a visitor location register (VLR).

44. The system of claim 40 wherein the telecommunications network element comprises a home location register (HLR).

45. The system of claim 40 wherein the owners or operators of an HLR in a home network of the particular mobile subscriber and the telecommunications network element are not the same.

46. The system of claim 40 wherein the message processing platform is contained within the telecommunications network element.

47. The system of claim 40 wherein the message processing platform is an external computing workstation coupled to the telecommunications network element.

48. The system of claim 40 wherein the message processing platform includes a message correlator/generator for correlating the mobile call signaling messages and for generating the change in location indication message.

49. The system of claim 40 wherein the message processing platform is adapted to identify a sequence of a mobile application part (MAP) update location request message, a MAP insert subscriber data message, and a MAP update location response message relating to a change in location of the particular mobile subscriber.

50. A system for automatically generating and sending a Short Message Service (SMS) message to a subscriber in a mobile communications network in response to a change in the location of the subscriber, the system comprising:

(a) a telecommunications network element for receiving a plurality of mobile call signaling messages and for screening mobile call signaling messages exchanged between a home location register (HLR) and a visitor location register (VLR) that relate to changes in location of mobile subscribers; and (b) a message processing platform associated with the telecommunications network element for correlating the screened mobile call signaling messages to identify mobile call signaling messages in a dialogue between the HLR and the VLR related to a change in location of the particular mobile subscriber and for generating a short message service (SMS) message intended for the particular mobile subscriber based on the correlated messages, wherein the telecommunications network element and the message processing platform are adapted to respectively perform the functions in elements (a) and (b) automatically in response to the change in location of the particular mobile subscriber.

51. The system of claim 50 wherein the telecommunications network element comprises a signal transfer point (STP).

52. The system of claim 50 wherein the telecommunications network element comprises a signaling gateway.

53. The system of claim 50 wherein the telecommunications network element comprises a visitor location register (VLR).

54. The system of claim 50 wherein the telecommunications network element comprises an HLR.

55. The system of claim 50 wherein the owners or operators of an HLR in a home network of the particular mobile subscriber and the telecommunications network element are, not the same.

56. The system of claim 50 wherein the message processing platform is contained within the telecommunications network element.

57. The system of claim 50 wherein the message processing platform is an external computing workstation coupled to the telecommunications network element.

58. The system of claim 50 wherein the message processing platform includes a message correlator/generator for correlating the MAP messages and for generating the change in location indication messages.

59. The system of claim 50 wherein the message correlator/generator is adapted to correlate the MAP messages based on a Dialogue ID in the MAP messages.

60. The system of claim 50 wherein the message processing platform is adapted to identify a sequence of a mobile application part (MAP) update location request message, a MAP insert subscriber data message, and a MAP update location response message relating to a change in location of the particular mobile subscriber.

61. A system for generating a message in response to a change in location of a mobile subscriber, the system comprising:
(a) a telecommunications network signaling node for receiving mobile call signaling messages and for screening selected mobile application part (MAP) messages exchanged between a home location register (HLR) and a visitor location register (VLR) in response to changes in location of mobile subscribers; and
(b) a message processing platform operatively associated with the signaling node for receiving the screened MAP messages, correlating the screened MAP messages to identify MAP messages in a dialogue between the HLR and the VLR for a change in location of a particular mobile subscriber, and generating a change in location indication message based on the correlated MAP messages, wherein the telecommunications network element and the message processing platform and adapted to respectively perform the functions in elements (a) and (b) automatically in response to the change in location of the particular mobile subscriber.

62. The system of claim 54 wherein the message processing platform is adapted to send the change in location indication message to a short message service center.

63. The system of claim 54 wherein the message processing platform is adapted to send the change location update message to a presence server.

64. The system of claim 61 wherein the telecommunications network signaling node comprises a signal transfer point for routing the mobile call signaling messages to their intended destinations.

65. The system of claim 61 wherein the message processing platform is adapted to identify a sequence of a mobile application part (MAP) update location request message, a MAP insert subscriber data message, and a MAP update location response message relating to a change in location of the particular mobile subscriber.

* * * * *